(12) United States Patent
Maimin

(10) Patent No.: US 8,544,708 B2
(45) Date of Patent: Oct. 1, 2013

(54) FOLDING PICK-UP TRUCK TOOL BOX

(76) Inventor: Julian Maimin, San Fernando, CA (US)

( * ) Notice: Subject to any disclaimer, the term of this patent is extended or adjusted under 35 U.S.C. 154(b) by 334 days.

(21) Appl. No.: 12/902,016

(22) Filed: Oct. 11, 2010

(65) Prior Publication Data

US 2012/0085800 A1    Apr. 12, 2012

(51) Int. Cl.
*B60R 7/00*    (2006.01)

(52) U.S. Cl.
USPC ........... 224/404; 224/498; 224/549; 296/37.6

(58) Field of Classification Search
USPC ........ 224/403, 404, 497, 498, 549; 296/37.5, 296/37.6, 37.8; 220/4.28, 4.29, 4.33
IPC .......................................................... B60R 9/06
See application file for complete search history.

(56) References Cited

U.S. PATENT DOCUMENTS

| | | | | |
|---|---|---|---|---|
| 6,257,640 | B1 * | 7/2001 | Leitner et al. | 296/37.6 |
| 6,536,826 | B1 * | 3/2003 | Reed | 296/37.5 |
| 7,234,618 | B2 * | 6/2007 | Warganich | 224/404 |
| 7,537,264 | B2 * | 5/2009 | Maimin et al. | 296/100.09 |

* cited by examiner

*Primary Examiner* — Nathan J Newhouse
*Assistant Examiner* — Scott McNurlen
(74) *Attorney, Agent, or Firm* — Kenneth H. Ohriner; Perkins Coie LLP

(57) ABSTRACT

A tool box can be unfolded for use in holding tools or other items, and then folded up, to avoid taking up space in a pick-up truck cargo box when the tool box is not in use. The toolbox may have a folding panel assembly including a first panel, a second panel pivotally attached to the first panel, and a third panel pivotally attached to the second panel. The folding panel assembly is foldable into an open position and into a closed position. In the open position, one or more of the panels may be supported on left and right side end frames attached to the inner sidewalls of the pick-up truck cargo box.

13 Claims, 3 Drawing Sheets

FOLDING PICK-UP TRUCK TOOL BOX

BACKGROUND OF THE INVENTION

Pick-up trucks are one of the most popular and versatile vehicles in use today. Pick-up trucks typically have an enclosed cab and an open cargo box behind the cab. The open cargo box allows all types of things to be quickly and easily loaded, carried and unloaded. The cargo box may be covered by covers of various types, to secure the contents of the box, reduce air turbulence at highway speeds, to protect the contents of the cargo box from the weather, and/or to improve the aesthetic appearance of the truck.

Various tool or storage boxes have also been used in pick-up truck boxes. These tool boxes, take up space in the pick-up truck box, regardless of whether they are in use or not. In addition, these tool boxes may interfere with or prevent use of a cover on the pick-up truck box. Accordingly, an improved tool box is needed for use in a pick-up truck box.

SUMMARY OF THE INVENTION

A new tool or storage box can be unfolded for use in holding tools or other items, and then folded up, to avoid taking up space in a pick-up truck box when the tool box is not in use. In one aspect, a toolbox adapted for use inside a pickup truck box may have a folding panel assembly including a first panel, a second panel pivotally attached to the first panel, and a third panel pivotally attached to the second panel. The folding panel assembly is foldable into an open position and into a closed position. In the open position, one or more of the panels may be supported on left and right side end frames or attachment pieces. In the open or unfolded position, the present tool or storage box holds tools or other items, much like a conventional pick-up truck tool box. However, when folded up into the closed position, the present tool or storage box moves out of the way and leaves the cargo box of the pick-up truck unobstructed, so that virtually the entire space in the cargo box is available for use.

Other features and advantages will become apparent from the following detailed description and discussion of the drawings.

BRIEF DESCRIPTION OF THE DRAWINGS

In the drawings, the same reference number indicates the same element in each of the views.

DETAILED DESCRIPTION

Figure 1:
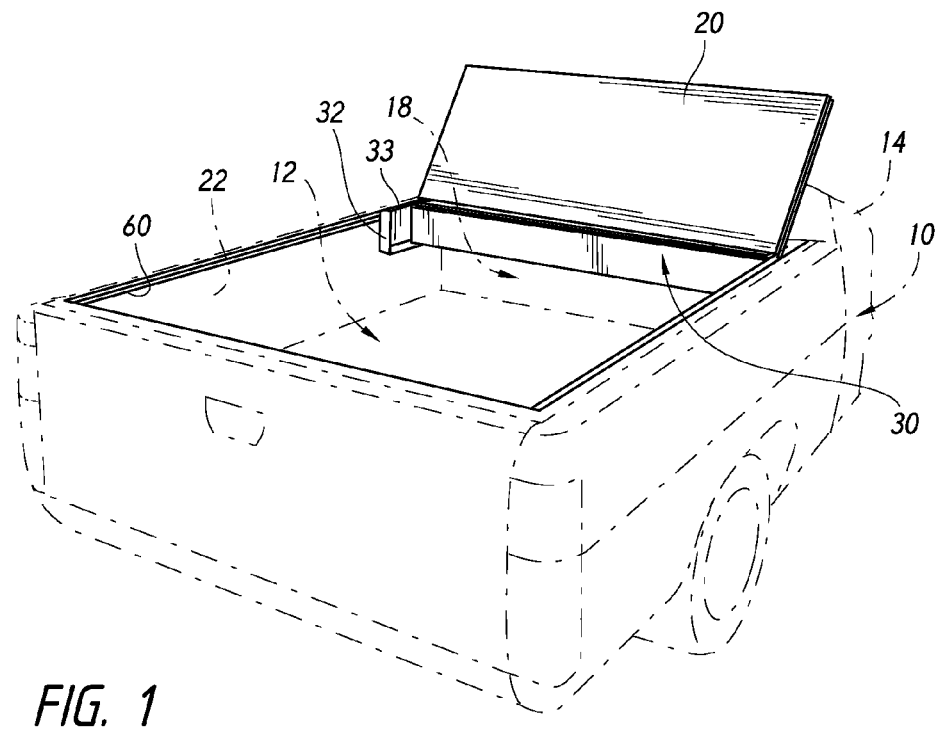
FIG. 1 is a perspective view of a new toolbox in a folded position, within the box of a pick-up truck.

Turning now in detail to the drawings, as shown in FIGS. 1-5, a pick-up truck 10 has a cargo box 12 and a cab 14. A cover 20 may be provided on the box 12. One type of cover 20 is described in U.S. Pat. No. 7,537,264, incorporated herein by reference. The cargo box 12 has a left sidewall 22 and a right sidewall 24. The cargo box 12 may also have a cab beam or panel 24 at the front end 18 of the box 12.

A toolbox 30 has a front or first panel 34 attached to a floor or second panel 38 by a first flex joint 36. A rear or third panel 42 is attached to the second panel 38 by a second flex joint 40. The first and second flex joints 36 and 40 are at opposite sides of the second panel 38. The panels 34, 38 and 42 may be flat, rectangular sections made of metal, plastic, wood, composites, or other materials. The flex joints 36 and 40 may be hinges or flexible material, such as rubber. The panels attached together via the flex joints form a folding panel assembly.

As shown in FIG. 1 a left end frame 32 is supported on the left sidewall 22 of the cargo box 12. A right end frame is similarly supported on the right sidewall 26 of the cargo box 12, in a mirror image of the left end frame 32. The end frame has front and rear walls extending vertically up from a bottom wall. The top of the end frame may be open. The folding panel assembly is positioned between the two end frames. The end frame 32 may have a lip or hook section 33 to allow the end frame to be suspended from the side rails 60 as described in U.S. Pat. No. 7,537,264, if the cargo box 12 is provided with a cover using side rails. The end frames can hang from the rails, without any other attachment between them. When the cover 20 is closed, prop arm fittings 172 attached to the rails prevent the box 30 from sliding rearward and the front or cab panel 106 prevents the box 30 from sliding forward. With the cover 20 closed, the box 30 cannot move up off of the rails. Alternatively, a snap in/snap out fitting can be used to hold the box 30 in place on the rails. A quick release pin or equivalent holding device 62 may also optionally be used to attach the end frames 32 to the rails 60 to secure the box 30 in place in the cargo box 12. The holding device 62 can optionally have a key/locking device to allow the box 30 to be locked onto the rails.

The first panel 34 may be attached (e.g., bolted, riveted, adhered, etc.) to the front wall 35 of the end frames. The folding panel assembly and the end frames together form a self-contained tool or storage box 30 that can be secured in the cargo box 12, and that can also be removed from the cargo box. For example, the storage box 30 can be released from the cargo box 12 by removing or releasing the holding devices 62, and the storage box can then be carried to a work site. Handles may be provided on the outside surface of the end frames, to allow the box 30 to be more easily carried by two people. Since the box 30 is self-contained, it can also be moved from one vehicle to another, or used anywhere, without a vehicle. For example, the box 30 can also be placed in the trunk of a car or SUV to temporarily hold items. When not in use, the box 30 can be folded up to provide additional space for luggage, etc.

Figure 2:
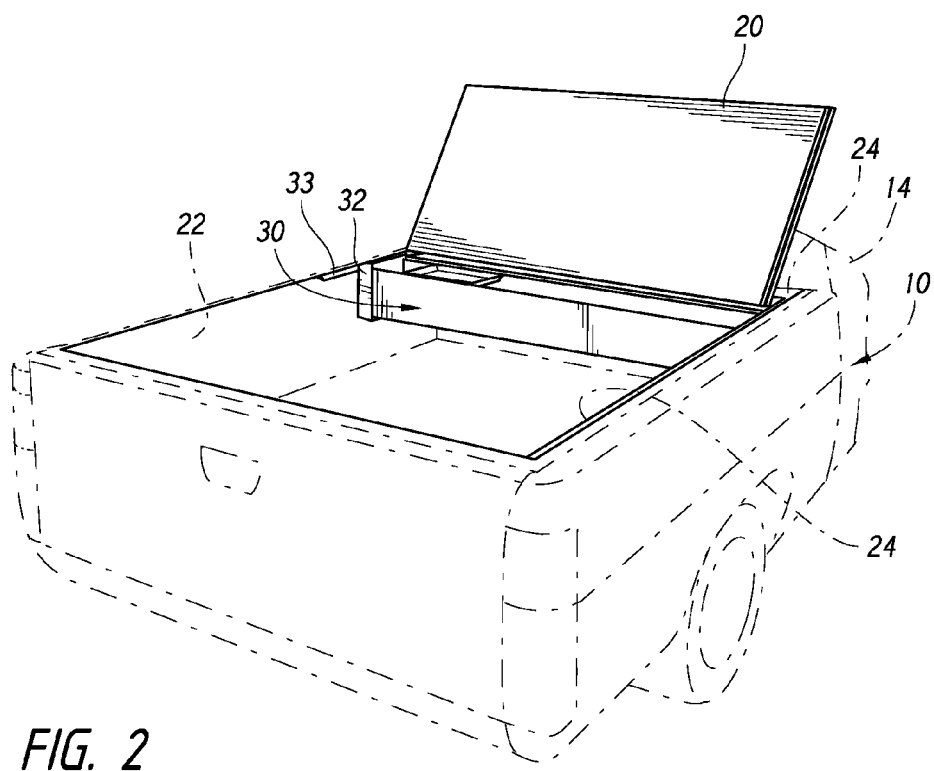
FIG. 2 is a perspective view of the toolbox in an unfolded position.
Figure 3:
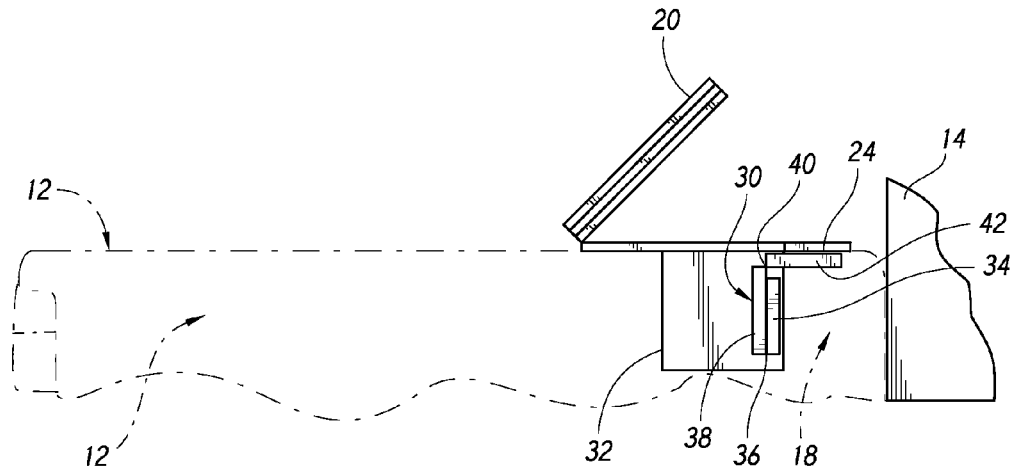
FIG. 3 is a section view of the toolbox as it is shown in FIG. 1.
Figure 4:
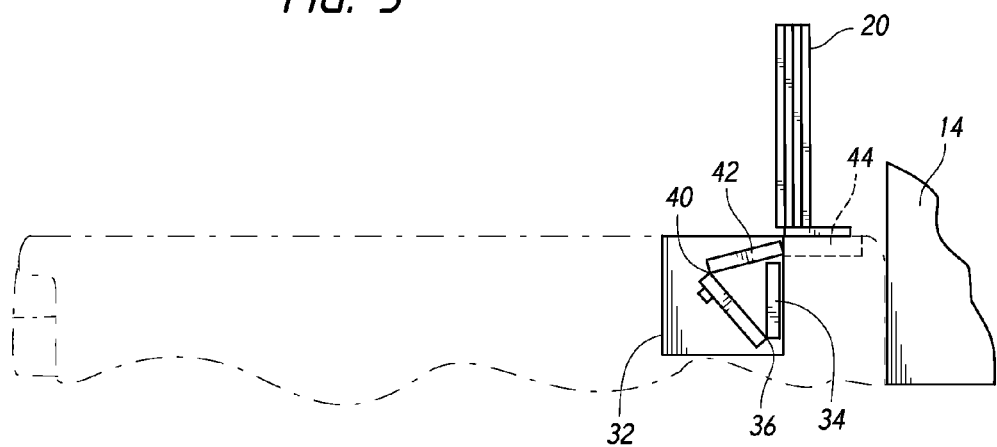
FIG. 4 is a section view of the toolbox in an intermediate position between the folded and unfolded positions.
Figure 5:
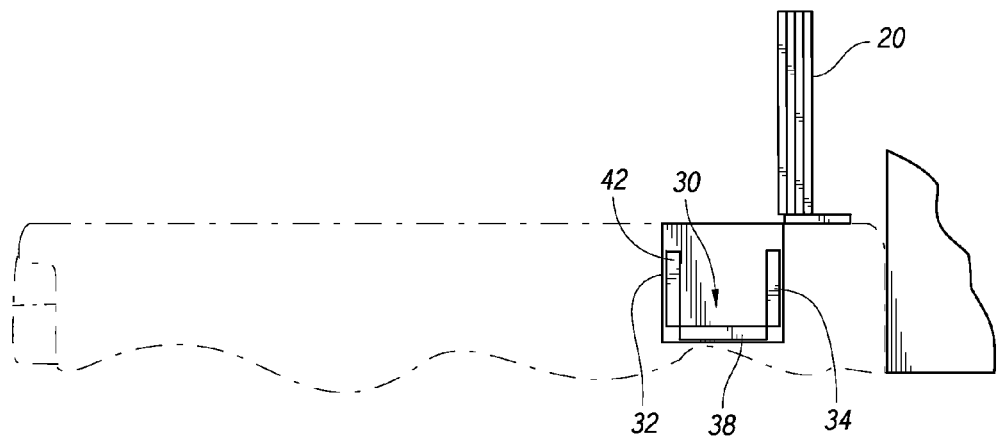
FIG. 5 is a section view of the toolbox in the unfolded position as shown in FIG. 2.
Figure 7:
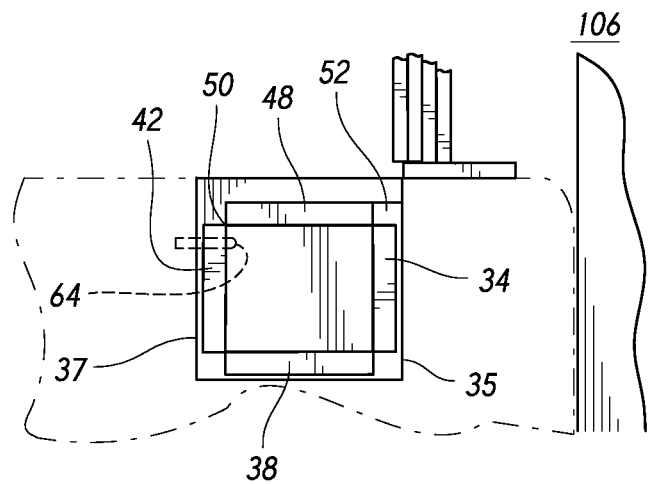
FIG. 7 is a section view of the alternative toolbox of FIG. 6 in an unfolded position.

As shown in FIGS. 1 and 3, the toolbox 30 may initially be folded up and out of the way when not in use. This leaves substantially the entire volume of the cargo box 12 available for cargo. In use, the toolbox 30 is unfolded by pivoting the second panel 38 downwardly. Referring to FIGS. 1-3, as this occurs, the third panel 42 is pulled back out of a space or slot 44 above and in front of the first panel 36. FIG. 4 shows the folding panel assembly partially unfolded in an intermediate position. The second panel 38 is unfolded until it bottoms out on the bottom of the end frames. The third panel 42 is unfolded until it contacts the rear walls of the end frames, as shown in FIG. 5. A Velcro strip attached to a back-facing surface of the end frames may engage a corresponding strip on a forward facing surface of the third panel, to hold the third panel upright. Alternatively, a stronger holding/locking device 64, such as a quick release pin, detent, clamp, panel lock, etc. may be placed on or through the rear wall 37 of the end frame and the third panel 42, to hold or lock the third panel 42 upright and in place against the rear wall 37 of the end frames, as shown in FIG. 7.

The toolbox 30 is then unfolded and ready to hold tools or other items. The toolbox 30 is returned to the folded position shown in FIG. 3 by following the reverse sequence of panel movements One or more grasping features, such as a ring, rope or handle, may be attached to the bottom surface of the second panel 38, inboard from the end frames, to facilitate unfolding the toolbox 30, In the unfolded position, the folding panel assembly is supported and held up and in place by the end frames. One or more laterally sliding trays may be provided in the toolbox 30, as shown in FIG. 2.

The end frames and folding panel assembly may be positioned sufficiently below the upper end of the cargo box to avoid interfering with the cover 20, if any, on the cargo box 12. In cargo boxes having side rails 60, the box 30 can be supported on the side rails via lip sections 33 on the end frames 32. In cargo boxes not having any cover, or having a cover but no side rails, U-shaped or channel brackets can be attached to the box rails or sidewalls of the cargo box 12, with the brackets holding the end frames 32 of the box 30. Especially where the cargo box has no cover, locking devices may optionally be used to lock the box 30 to the side rails or to the brackets if desired, to prevent removal of the box without a key. In addition, in either case, any type of tonneau or cargo box cover may be used on the cargo box, because the box 30 and brackets or other mounting hardware can be positioned below the top surface of the box rails, or below the position occupied by the cover when it is closed. Since the box 30 is below the box rails, unlike many conventional pick-up truck toolboxes, it does not interfere with rear visibility when backing up. In addition, with the cover 20 closed, the box 30 is entirely contained and concealed within the cargo box 12. In addition, unlike a conventional tool box, the box 30 may be folded up at any place and time, to make room in the cargo box 12, as may be needed.

Figure 6:
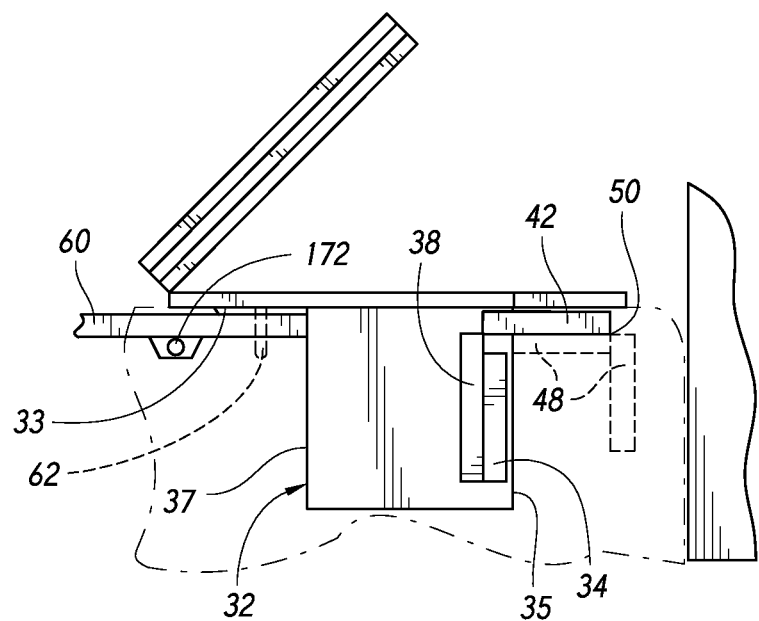
FIG. 6 is a section view of an alternative toolbox in the folded position.

The toolbox 30 shown in FIGS. 1-5 has an open top. The contents of the toolbox 30 may be secured by covering and closing the cargo box 12 using a cover 20. FIGS. 6 and 7 show an alternative design with the toolbox having a fourth panel 48 that provides a cover for the toolbox. In this design, the contents of the toolbox can be secured with the cover 20 of the cargo box 12 left open, or when no cover 20 is used.

The fourth panel 48, if used, is pivotally attached to the third panel via a third flex joint 50. A latch or lock 52 may be provided on the fourth panel 48 on the side opposite from the third flex joint 50. The lock 52 can engage into the cab panel 24 or the fixed first panel 52, to lock the fourth panel 48 down in the position shown in FIG. 7. When in the folded position shown in FIG. 6, the fourth panel 48 may be folded up against and parallel to the third panel 42, with the both the third and fourth panels contained within the slot 44. Alternatively, the fourth panel 48 may pivot down from the third panel, as shown in dotted lines in FIG. 6.

In another embodiment, the surfaces of the end frames that contact the panels may be provided with a resilient seal, such as a rubber strip, to allow the box 30 to be generally watertight. The box 30 may then be filled with ice, food and drinks, carried from the pick up truck to a picnic or camping site, and there used as a cooler or an ice chest, In this design, the panels may be made with an insulating material, such as polystyrene, honeycomb, or similar material, laminated between cover sheets or plates of metal or plastic, such as ABS, a composite or fiberglass reinforced material, or similar material. This provides a strong construction, allowing the box 30 to support up to 400 lbs. This embodiment may include a fourth panel 48, as described above, to cover the contents of the box 30 and help to keep the contents cold.

In a typical design, the box 30 may be about 10-12 inches deep, 9-11 inches wide and up to 65 inches long, while still able to fold up largely into the space under the cab panel 66, as shown in FIG. 6. Unlike conventional pick-up truck toolboxes however, since the box 30 can be folded, it can also be shipped folded in a generally flat shipping package. Shipping conventional pick-up truck toolboxes is cumbersome and costly. In general, conventional pick-up truck toolboxes are heavy and bulky. Packaging and shipping costs are therefore high. Damage rates during shipping are also high. Since the box 30 can be shipped in the folded position, wherein it is relatively flat compared to a conventional pick-up truck toolbox, packing and shipping costs, as well as potential for damage during shipping are greatly reduced.

The package for the cover need only contain the folding panel assembly, the two end frames, and optionally one or more shelves. Four self-tapping screws may also be included. To install the box 30, the folding panel assembly is placed square between the end frames. Two holes are drilled through front wall of each end frame and into the first panel. The self-tapping screws are then used to secure the first panel to the end frames. Velcro straps may be attached to the back wall of each end frame, for use in holding the third panel vertically upright. The box 30 can then be placed into the cargo box 12 by resting the lip or hook section of the end frames onto the rails 60.

Thus, a novel toolbox has been shown and described. Various changes and modifications may of course be made without departing from the spirit and scope of the invention. The invention, therefore, should not be limited, except to the following claims, and their equivalents.

The invention claimed is:

1. A folding toolbox for a pickup truck, comprising:
a left end frame;
a right end frame:
a first panel attached to the left and right end frames;
a second panel pivotally attached to the first panel;
a third panel pivotally attached to the second panel;
and with the toolbox foldable between an open position wherein the second panel is supported on the left and right end frames and is substantially perpendicular to the first panel, and the third panel is held in a position substantially parallel to the first panel by the left and right end frames, and a folded position wherein the second panel is substantially parallel to the first panel, and the third panel is substantially perpendicular to the first panel.

2. The folding toolbox of claim 1 wherein the third panel is on top of the first panel when the toolbox is in the folded position.

3. The folding toolbox of claim 2 wherein the third panel extends forward of the first panel, when the toolbox is in the folded position.

4. The folding toolbox of claim 1 wherein the left and right end frames are generally U-shaped.

5. The folding toolbox of claim 1 wherein the first, second and third panels have substantially the same length and wherein each of the panels extends entirely across the width of the truck box.

6. The folding toolbox of claim 1 the second panel having a height greater than the first panel.

7. The folding toolbox of claim 1 wherein the toolbox in the open position, the first and third panels are substantially vertical and the second panel is substantially horizontal.

8. A folding toolbox adapted for use in a pickup truck box, comprising:

first and second end frames, with each end frame having an open top, a base, and front and back spaced apart parallel arms attached to opposite ends of the base and extending up from the base;

a folding panel assembly having a first panel, a second panel pivotally attached to the first panel, and a third panel pivotally attached to the second panel, and with the folding panel assembly foldable between an open position wherein the second panel is substantially perpendicular to the first panel, and a folded position wherein the second panel is substantially parallel to the first panel; and the arms of the end frames each having a height greater than the height of the first, second or third panels, and with the first and third panels having substantially the same height.

9. The folding toolbox of claim 8 with the first panel having a thickness T1 and the third panel having a thickness T3, and with the base of the first and second end frames having a length substantially equal to the length of the second panel plus T1 and T3.

10. The folding toolbox of claim 8 wherein all of the panels are below an upper surface of the truck box, with the toolbox in the open position or in the folded position.

11. The folding toolbox of claim 8 further comprising a cab panel attached adjacent to a front end of the truck box, and with the third panel moveable to a position underneath and generally parallel to the cab panel.

12. The folding toolbox of claim 8 with the left and the right side end frames each having a hook section for engaging left and right side rails, attached onto left and right sides of the pick-up truck box.

13. The folding toolbox of claim 8 with the first, second and third panels extending laterally across the pickup truck box and perpendicular to the left and right walls of the pickup truck box.

* * * * *